United States Patent [19]
Kolev et al.

[11] Patent Number: 6,108,318
[45] Date of Patent: Aug. 22, 2000

[54] SYSTEM AND METHOD FOR DATA LINK SYNCHRONIZATION

[75] Inventors: Javor Kolev, Cary; Carsten Hoirup, Raleigh, both of N.C.

[73] Assignee: Ericsson Inc, Research Triangle Park, N.C.

[21] Appl. No.: 08/811,279

[22] Filed: Mar. 4, 1997

[51] Int. Cl.[7] .................................................. H04B 7/212
[52] U.S. Cl. ........................... 370/323; 370/316; 370/324
[58] Field of Search ..................................... 370/316, 328, 370/323, 324, 465, 466, 522, 310; 375/222

[56] References Cited

U.S. PATENT DOCUMENTS

| | | | |
|---|---|---|---|
| 5,008,952 | 4/1991 | Davis et al. | 455/12 |
| 5,331,318 | 7/1994 | Montgomery | 340/855.4 |
| 5,530,704 | 6/1996 | Gibbons et al. | 370/510 |
| 5,579,379 | 11/1996 | D'Amico et al. | 379/122 |
| 5,689,568 | 11/1997 | Laborde | 380/49 |
| 5,838,745 | 11/1998 | Wang et al. | 375/364 |

FOREIGN PATENT DOCUMENTS

| | | |
|---|---|---|
| 0 748 064 A2 | 4/1996 | European Pat. Off. ................. 455/12 |
| 195 15 418 A1 | 4/1995 | Germany . |
| WO 94/28670 | 5/1994 | WIPO . |
| WO 97/08884 | 8/1996 | WIPO . |

OTHER PUBLICATIONS

PCT Search, Oct. 26, 1998.
Shinnai et al., *Satellite and Terrestrial Link Switching Control Method Using High–Speed Time–Division Multiplexer*, NRI and NCC Co., Ltd., Tokyo, Japan 160, Electronics and Communications in Japan, Part 1, vol. 73, No. 10, 1990, pp. 90–100.
A. Karas et al., Terminal á débits intermédiares pour les télécommunictions par satellite, Tansmission 15 (1993) No. 2, Paris, Fr., pp. 63–70.

*Primary Examiner*—Jeffery A. Hofsass
*Assistant Examiner*—Mitchell Slavitt
*Attorney, Agent, or Firm*—Jenkens & Gilchrist

[57] ABSTRACT

A system and method for improving communication between two user terminals in a telecommunication system is disclosed. When two user terminals, such as in a satellite-based system with a terrestrial network interface, switch from a double-hop connection with the network to a single-hop connection with each other, communication is established according to the present invention by synchronizing the protocol parameters between the two user terminals, which in the double-hop connection were separately synchronized with the network.

29 Claims, 2 Drawing Sheets

SYSTEM AND METHOD FOR DATA LINK SYNCHRONIZATION

BACKGROUND OF THE PRESENT INVENTION

Field of the Invention

The present invention relates generally to a telecommunications system and method for improved data link synchronization, particularly, to a telecommunications system and method for improved data link synchronization between two user terminals via a satellite connection, and more particularly, to a telecommunications system and method for data link synchronization between two user terminals upon establishing a single-hop satellite connection.

BACKGROUND AND OBJECTS OF THE PRESENT INVENTION

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which time the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

Numerous telecommunications systems have been designed to implement wireless telephony, e.g., the Advanced Mobile Phone Service (AMPS) cellular system in the United States, the Nordic Mobile Telephone (NMT) system in Northern Europe, and more recently the Global System for Mobile Communications (GSM) and DCS 1800 digital systems. All of the above systems are, however, terrestrial systems, i.e., having earth-based as opposed to satellite-based transmissions.

The Association of SouthEast Asian Nation's (ASEAN) Cellular Satellite (ACeS) system is such a satellite-based Digital Mobile Satellite (DMS) system providing telephone coverage by use of a geo-stationary satellite. Although still in the specification stage, ACeS is essentially an adaption of the popular GSM specification. Expected to be deployed over SouthEast Asia, ACeS would provide coverage to areas having limited land-line and cellular infrastructures, allowing use of hand-held pocket phones across Asia. When deployed, the satellite footprint of the ACeS system will allow service from India to Japan and from Northern China to Indonesia using a large number of spot beams.

In digital satellite-based telecommunications systems, such as ACeS and other DMS systems, the connection between one subscriber, the call-originating user terminal, and another, the call-terminating user terminal, is first established through an intermediary, a terrestrially-based telecommunications network. After establishing discrete links between the call-originating user terminal (UT) and the network and the network and the call-terminating UT, i.e., a double-hop radio connection via an orbiting satellite, the two UTs may then establish a direct communication without the intermediary network, i.e., a single-hop radio connection via the satellite.

Essential to any kind of peer-to-peer exchange of information, e.g., between a UT and the network or between two UTs, is the usage of a standard communication protocol. One such protocol, the International Standards Organization (ISO) protocol, has seven layers, one of which is the Data Link (DL) layer. This layer controls the manipulation of data packages, particularly, the addressing of outgoing packets and the decoding of the addresses on incoming packets. The protocol for the DL layer, therefore, controls the peer-to-peer transmission of data through packet exchange. As is understood by those skilled in the art, the DL protocol uses uniform frame structures, field formats and communications procedures to govern the physical exchange of the packet data at the physical layer, a lower layer in said ISO protocol, pursuant to directives from higher layers. The most important task of a DL layer, therefore, is to provide an error-free connection for the layers above. In such a DL protocol, one peer is designated as the "network" and another peer as a UT with different parameter settings in the DL message.

As is understood by those skilled in the art, the exchange of data between two devices is dependent upon the proper reception at the DL layer of the packets. The DL frames carrying the data are sequentially numbered for each DL layer and each device's DL layer keeps track of every transmitted or received frame. Special variables, such as frame counters and labels, are employed by each DL layer to number and mark, respectively, the transmitted and received frames of packet data. The correctness of these sequential counters and the marks in a communication ensures the proper handling of the digital information. Mechanisms for the retransmission of the data packets in case of error are also provided by the DL layer protocol.

One problem, however, with a digital satellite-based telecommunication system, such as ACeS, is that when changing over from the double-hop to a single-hop connection, the DL layer protocols of the UT—UT pairing do not match. The reason is that the DL layer protocols of the respective double-hop connections, i.e., between the call-originating UT and the network and the separate connection between the network and the call-terminating UT, are independent and not synchronized with respect to each other. Furthermore, the two UT DL peers configure outgoing messages as UT messages and expect to receive messages configured by the network. Hence, at the end of set-up signaling when the network connects the two UTs to a single radio channel, i.e., a single-hop connection, and the active call state is entered, the two DL layer protocols of the two now conjoined UTs are not in sync with each other. Instead, each UT is synchronized separately to the network's DL layer protocol. Consequently, any data transmitted by one UT to another UT during such a mismatched-protocol, single-hop connection will not be handled properly, if accepted at all.

The solution, of course, is to synchronize the two UT DL layers to each other so that the UTs can properly communicate. However, the present specifications for the proposed satellite-based telecommunications systems, such as ACeS, do not address this problem and fail to provide any means for such resynchronization. Further, simple solutions such as resetting the appropriate local DL layer parameters in each peer DL layer at the start of the single-hop connection and ignoring the flags/labels in the layer protocol, are inadequate since such an approach does not provide the security needed to handle all possible exception conditions. In practice, this would mean the disabling of the Data Link layer. Thus, this solution fails to ensure the proper handling of the continued data in all cases and a more robust solution is necessary to effectuate synchronization and communication.

Accordingly, it is an object of the present invention to modify a digital satellite-based telecommunication system, such as in the presently developed ACeS system, to overcome the aforedescribed synchronization problems. However, since modification of ACeS or other standardized satellite-based systems would be difficult, unconventional and costly, minimizing or avoiding modifications to various non-handset equipment implementing the aforementioned satellite-based systems would be preferred.

It is, therefore, an additional object of the present invention to provide a robust synchronization solution that does not require the addition of new functionality in the satellite-based telecommunication system.

It is a further object of the present invention to provide a robust solution to the aforementioned synchronization problems with minimal modifications to established or proposed transmission protocols.

SUMMARY OF THE INVENTION

The present invention is directed to a system and method for improving communication between two user terminals in a telecommunication system. When two user terminals, such as in a satellite-based system with a terrestrial network interface, switch from a double-hop connection with the network to a single-hop connection with each other, communication is established according to the present invention by synchronizing the protocol parameters between the two user terminals, which in the double-hop connection were separately synchronized with the network.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
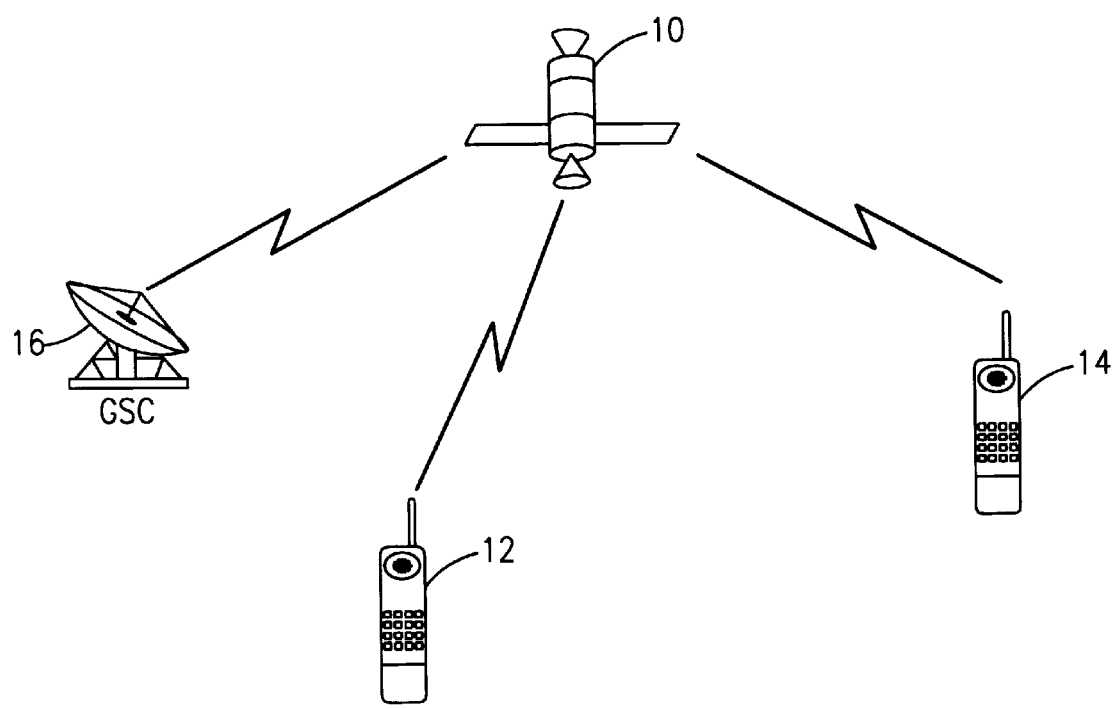
FIG. 1 is a diagram illustrating the radio communication between two user terminals and a network in a satellite-based telecommunication system such as the system of the present invention.

With reference now to FIG. 1, there is illustrated a simplified diagram of an ACeS satellite-cellular communication network. A satellite 10, such as one in geo-stationary orbit over SouthEast Asia in the ACeS system, forwards and receives digital information via radio to and from a variety of land-based equipment, such as a first 12 and a second 14 cellular phone or user terminal and a Ground Signal Control (GSC) 16, which controls call management functions for the above and other user terminals within the purview of the ACeS or other satellite-based telecommunications system.

When a call-originating subscriber to the ACeS system portrayed in FIG. 1, e.g., user terminal 12, calls another subscriber in the system, e.g., user terminal 14, a two-legged communication is first established. As is understood by those skilled in the art, satellite 10 is, at present, unable to immediately transfer the call from user terminal 12 to the call-terminating subscriber, e.g., user terminal 14. Instead, the call request is first forwarded to the land-based GSC 16 which has the capability to manage the connection. Thus, the first leg or first hop, as is known in the art, is UT 12-satellite-GSC 16.

The GSC 16, upon receiving the call request information from the call-originating UT 12, attempts to contact the designated call-terminating UT 14. Again, this communication is via satellite 10. Thus, the second leg or second hop is GSC 16-satellite-UT 14. At the end of the aforedescribed setup procedure, the GSC 16 directs the satellite 10 to connect the traffic channels of both UTs 12 and 14 to each other, creating a single-hop or UT 12-satellite-UT 14 connection. The two user terminals now communicate directly with one another and the GSC 16 is no longer involved in the signaling.

However, as discussed hereinbefore, the transition from double- to single-hop in the aforedescribed satellite-based telecommunications system is problematic and the two user terminals, although now directly connected to each other via satellite 10, are not synchronized with respect to one another. In other words, DL frames received by a peer DL will not be accepted since the requisite parameters are not set as a network. Consequently, the frames and the information therein are discarded and lost.

The reason for the lack of synchronicity between the UTs in the aforesaid single-hop connection is that the Data Link (DL) layer protocols mismatch. As is understood by those skilled in the art, the DL layer protocols, using the aforementioned frames, field formats and procedures, employ special mechanisms to ensure the continuity and quality of data transfers. Other mechanisms take care of error handling and release of the data link if non-reparable conditions occur. All of those mechanisms utilize special variables, e.g., counters and labels to number and mark, respectively, the frames. These variables include the N(S) and N(R) frame sequence counters for transmitted and received frames, respectively, the Command/Response (C/R) flag and the Poll/Final (P/F) flag. As discussed, the correctness of these and other such counters and flags ensures the proper handling of the data contained within other fields of those frames, when accepted. It should further be understood that the correctness of these variables is important throughout the transmission to ensure the continuing reliable exchange of data. For simplicity, further particularities of the DL layer protocol mismatching for these and other variables are omitted, but should nonetheless be understood by those skilled in the art.

Figure 2:
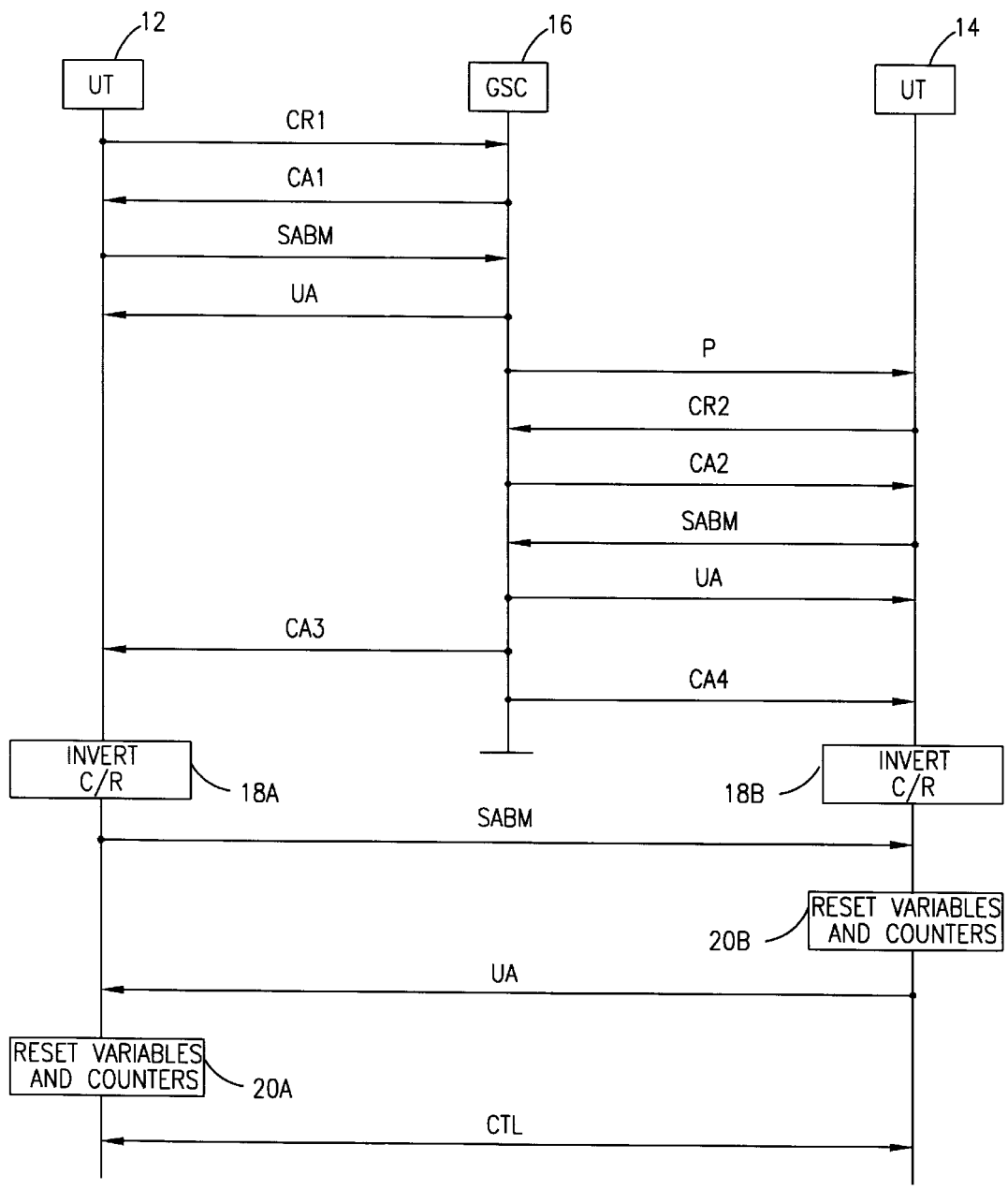
FIG. 2 is a call flow diagram illustrating the steps followed by the telecommunications system of the present invention illustrated in FIG. 1 in handling the double-hop to single-hop synchronization between the two user terminals.

With reference now to FIG. 2, there is shown a call flow diagram for synchronizing two UTs in a single-hop connection in accordance with the present invention. As discussed, prior to the establishment of the single-hop connection, there is a double-hop connection between the UTs via a land-based network, e.g., GSC 16. The sequential steps for the establishment of the double-hop and synchronized single-hop will now be illustrated and described.

The call-originating UT 12, such as a cellular phone, first initiates a channel request (CR1), which is forwarded to the GSC 16 via satellite 10. The GSC 16 then responds with a channel assignment (CA1). At this point the UT 12 and GSC 16 begin the aforedescribed synchronization of DL layer counters, flags and other protocols with each other. To effectuate synchronization, the UT 12 transmits a Set Synchronous Balanced Mode (SABM) to the GSC 16, including an information field, which pursuant to DL layer protocol indicates initialization. The GSC 16 responds with an unnumbered acknowledgment (UA) signal, completing the initialization of the DL layer protocols for that connection. It should be understood by those skilled in the art that the SABM command is preferably transmitted by the UT 12 on the Stand Alone Dedicated Control Channel (S-SDCCH) to the call-terminating UT 14. It should be understood to those skilled in the art, however, that a general dedicated control channel may suffice. After the aforementioned SABM/UA exchange, the protocols for the UT 12 and the GSC 16 are in sync and multiframe data exchange therebetween may take place with good transmission reliability and error checking.

Having synchronized itself with UT 12, the GSC 16 then pages (P) the call-terminating UT 14, which if active responds with a channel request (CR2). The GSC 16 then assigns a channel (CA2), substantially as described hereinbefore in connection with channel assignment CA1, which is forwarded to UT 14. As with the synchronization procedure between UT 12 and GSC 16, UT 14 then forwards an SABM signal to the GSC 16, which responds with another unnumbered acknowledgment (UA) signal, initializing and synchronizing the UT 14 and GSC 16 Data Link protocols to each other, as described hereinbefore. Unlike the aforementioned synchronization procedure between the UT 12 and GSC 16, however, the UT 14-GSC 16 DL synchronization parameters may differ from those of the previous UT 12-GSC 16 synchronization.

With further reference to FIG. 2, the GSC 16 of the telecommunications system establishes the double-hop connection by assigning particular satellite traffic channels to both the UT 12 and the UT 14, the channel assignments being represented in FIG. 2 by CA3 and CA4, respectively. It should be understood that the aforedescribed double-hop connection between the two UTs is established when the GSC 16 orders the satellite 10 to connect the two traffic channels, CA3 and CA4, to each other, converting the connection to a single-hop one.

Once the UTs are configured to communicate on the same satellite link, communication with the GSC 16 may be severed. As with the aforementioned UT-network SABM synchronization signals, the UT 12 then forwards an SABM signal without an information field to the UT 14, which initiates a command to reset (box 20B) the aforementioned synchronization variables, i.e., counters and flags therein to a particular protocol configuration, such as an initialization configuration. The UT 14 then transmits an unnumbered acknowledgment (UA) signal back to the UT 12, which performs the same protocol reconfiguration. The UT 12 then resets (box 20A) the various counters and flags therein to the same protocol configuration as in UT 14. Thus synchronized, the aforedescribed data packet transference at the DL layer may now take place reliably across a common traffic link (CTL), as illustrated in FIG. 2.

Additionally, it should be understood that prior to transmitting the aforedescribed UT—UT SABM command and the UA response, the respective UTs preferably reconfigure the bit representing the aforementioned Command/Response (C/R) flag, as illustrated in FIG. 2 by the inverters 18A and 18B for UT 12 and UT 14, respectively. During the SABM/UA exchange, UT 12 and UT 14 separately perform and complete the requisite protocol reconfiguration and multiframe establishment operations in advance of transmitting any other signaling message across the data links. These operations ensure the re-initialization of all frame sequence counters, i.e., subsequently transmitted frames arrive on the peer side with the correct frame numbers and other parameters, which are in accordance with the expected values of the peer.

In other words, prior to the aforedescribed variable and counter reinitialization and as long as the call remains active, each UT DL layer inverts the aforesaid C/R bit, via the respective inverters 18A and 18B shown in FIG. 2, in the address field of the information frames before transmitting them to the peer layer. In this manner, an originated command from the two peers will appear as a network command to the respective peer, which without the bit inversion would have received and interpreted the message as a response and considered the message erroneous. Practically, this means that each transmitting DL layer in a UT behaves as a network when handling the C/R flag. In the preferred embodiment of the invention, the C/R flag is set to one ("1") for commands and zero ("0") for responses, which is how the DL protocol specifies the configuration of those parameters by the network. Additionally, the P/F flag in transmitted frames is set as usual, i.e., in correspondence to the particular type of message and the possible answer request to it.

In the aforedescribed manner, the inverted network configuration of the C/R flag and the correct configuration of the P/F flag within transmitted frames ensures that no error conditions arise at the receiving peer. Furthermore, the receiving DL layer sees all DL layer parameters with correct values, such as having been sent by the network or GSC 16 in a UT-network call. Consequently, the DL layers of the two UTs maintain the correct communication protocol with each other and all messages pertaining to upper protocol layers can be received and supplied. This ensures that correct in-call, as well as correct call-clearing signaling, operates in an efficient manner.

The aforementioned preferred embodiment of the present invention provides synchronized UT—UT call establishment in an ACeS and any other digital satellite-based telecommunications system that may use a single-hop connection. Without the aforedescribed synchronization mechanism for single-hop communications in such systems, the data link carrying the call will deteriorate upon the reception of the first data message between the two single-hopped UTs. Without synchronization, the UTs would be unable to exchange information and will expend a lot of DL and other resources in error handling and trying to recover from abnormal conditions. Further, without adequate synchronization, user interface functionality, related, e.g., to in-call signaling, may not be functional and calls may be dropped. The aforedescribed preferred embodiment of the present invention on the other hand is robust and avoids the requirement of new ACeS functionality to operate.

It should be understood by those skilled in the art that in order to avoid modifications to ACeS (or other proposed satellite telecommunications systems) the implementation of the aforementioned synchronization technique preferably resides entirely within the user terminals, more preferably, within software and databases therein.

It should also be understood that the network functions served by the terrestrially-based GSC 16 in the preferred embodiment of the present invention may instead be handled within an orbiting satellite, such as the aforedescribed satellite 10 mediating the resultant single-hop connection in the preferred embodiment. It should additionally be understood that the aforementioned single-hop connection may be established and/or mediated through a multiplicity of satellites.

The previous description is of a preferred embodiment for implementing the invention, and the scope of the invention should not necessarily be limited by this description. The scope of the present invention is instead defined by the following claims.

What is claimed is:

1. A satellite-based telecommunications system having a multiplicity of user terminals and a terrestrially-based network, said user terminals and said network being in communication with a satellite of said system, said user terminals and said network each having a plurality of protocol parameters governing said communication, said system comprising:

a first of said multiplicity of user terminals, said first user terminal, upon establishing a first connection with said network via a first channel on said satellite, synchronizing said plurality of protocol parameters therein with said network;

a second of said multiplicity of user terminals, said second user terminal, upon establishing a second connection within said network via a second channel on said satellite, synchronizing said plurality of protocol parameters therein with said network;

synchronization means, upon establishing a common channel on said satellite between said first and second user terminals, for synchronizing said plurality of protocol parameters for said first user terminal with the corresponding plurality of protocol parameters for said second user terminal across a third, single-hop connection via said satellite, said plurality of protocol parameters comprising at least one frame counter, said synchronization means being within said first and second user terminals, wherein said protocol parameters comprise DL frame control data, said control data in one configuration indicating a user terminal mode, and said control data in a second configuraiton indicating a network mode.

2. The system according to claim 1, wherein said synchronization means further comprises a database system within said first and second user terminals.

3. The system according to claim 1, further comprising:

an inverter, within said first and second user terminals, for inverting a given one of said plurality of protocol parameters within said DL frame control data.

4. The system according to claim 3, wherein said given one of said plurality of protocol parameters is a Command/Response flag.

5. The system according to claim 3, wherein said inverter inverts said given one of said plurality of protocol parameters prior to synchronization by said synchronization means, said given one of said protocol parameters being set to said network mode.

6. The system according to claim 1, further comprising:

reset means, within said first and second user terminals, for resetting said respective pluralities of protocol parameters to an initial state, said reset means for said second user terminal resetting said plurality of protocol parameters therein upon reception of a synchronization command from said first user terminal, and said reset means for said first user terminal resetting said plurality of protocol parameters therein upon reception of a response command from said second user terminal, thereby synchronizing said plurality of protocol parameters between said first and second user terminals.

7. The system according to claim 1, wherein said satellite-based telecommunications system is ACeS.

8. The system according to claim 1, wherein said first and second user terminals are satellite/cellular phones.

9. The system according to claim 1, wherein said plurality of protocol parameters comprises a plurality of Data Link parameters.

10. A method for synchronizing a first and a second user terminal in a single-hop connection within a satellite-based telecommunications system, said system including at least one satellite in communication with said user terminals and a terrestrially-based network, said method comprising the steps of:

establishing a first connection between said first user terminal and said network via a first channel on said satellite, said first user terminal synchronizing a plurality of protocol parameters with those of said network;

establishing a second connection between said network and said second user terminal via a second channel on said satellite, said second user terminal synchronizing a corresponding plurality of protocol parameters with those of said network;

assigning a common channel on said satellite for said first and second user terminals, establishing a third connection between said first and second user terminals via said common channel on said satellite; and synchronizing said pluralities of protocol parameters of said first and second user terminals to each other said step of synchronizing comprising the steps of:

transmitting, from said first user terminal to said second user terminal, a synchronization command;

responding, to said first user terminal, with an acknowledgment signal; and inverting a given one of said plurality of protocol parameters.

11. The method according to claim 10, wherein said given one of said plurality of protocol parameters is a Command/Response flag.

12. The method according to claim 10, wherein said step of inverting is performed prior to said step of transmitting said synchronization command.

13. The method according to claim 10, wherein said synchronization command is a Set Synchronous Balanced Mode command.

14. The method according to claim 10, wherein said acknowledgment signal is an Unnumbered Acknowledgment signal.

15. The method according to claim 10, wherein said step of synchronizing further comprises the step of:

resetting said plurality of protocol parameters within said second user terminal prior to the transmission of said acknowledgment signal.

16. The method according to claim 10, wherein said synchronizing further comprises the step of:

resetting said plurality of protocol parameters within said first user terminal after the reception of said acknowledgment signal.

17. The method according to claim 10, wherein said plurality of protocol parameters comprises a plurality of Data Link protocol parameters.

18. The method according to claim 10, wherein said plurality of protocol parameters comprises at least one frame counter.

19. The method according to claim 10, wherein said satellite-based telecommunications system is ACeS.

20. The method according to claim 10, wherein said first and second user terminals comprise a database system for said synchronizing the pluralities of protocol parameters.

21. The method according to claim 10, further comprising the step of:

transferring a plurality of data from at least said first user terminal to said second user terminal.

22. A user terminal for a satellite-based telecommunications system, said user terminal being one of a multiplicity of user terminals in communication with a satellite in said system, said user terminal also being in communication with a terrestrially-based network via said satellite, said user terminal and said network each having a plurality of protocol parameters governing said communication, said user terminal comprising:

a transmitter for transmitting a setup signal from said user terminal to said network via said satellite, said network transmitting a second signal to a second user terminal via said satellite and establishing a double-hop connection between said user terminal and said second user terminal;

synchronization means for establishing a single-hop connection between said user terminal and said second user terminal via said satellite, and for synchronizing said plurality of protocol parameters for said user terminal with the corresponding plurality of protocol parameters for said second user terminal across said single-hop connection, said plurality of protocol parameters comprising at least one frame counter; and reset means, within said user terminal, for resetting said respective pluralities of protocol parameters to an initial state, said reset means resetting said plurality of protocol parameters therein upon reception of a response command from said second user terminal, thereby synchronizing said plurality of protocol parameters between said user terminal and said second user terminal.

23. The user terminal according to claim 22, wherein said synchronization means comprises a database system within at least one of said user and said second user terminals.

24. A satellite-based telecommunications system having a multiplicity of user terminals and a terrestrially-based network, said user terminals and said network being in communication with a satellite of said system, said user terminals and said network each having a plurality of protocol parameters governing said communication, said system comprising:

a first of said multiplicity of user terminals, said first user terminal, upon establishing a first connection with said network via a first channel on said satellite, synchronizing said plurality of protocol parameters therein with said network;

a second of said multiplicity of user terminals, said second user terminal, upon establishing a second connection within said network via a second channel on said satellite, synchronizing said plurality of protocol parameters therein with said network;

synchronization means, upon establishing a common channel on said satellite between said first and second user terminals, for synchronizing said plurality of protocol parameters for said first user terminal with the corresponding plurality of protocol parameters for said second user terminal across a third, single-hop connection via said satellite, said plurality of protocol parameters comprising at least one frame counter; and reset means, within said first and second user terminals, for resetting said respective pluralities of protocol parameters to an initial state, said reset means for said second user terminal resetting said plurality of protocol parameters therein upon reception of a synchronization command from said first user terminal, and said reset means for said first user terminal resetting said plurality of protocol parameters therein upon reception of a response command from said second user terminal, thereby synchronizing said plurality of protocol parameters between said first and second user terminals.

25. The system according to claim 29, wherein said synchronization means comprises:

circuitry, within said first and second user terminals, for synchronizing said protocol parameters across said third connection.

26. The system according to claim 25, wherein said synchronization means circuitry comprises a database system within said first and second user terminals.

27. The system according to claim 24, wherein said satellite-based telecommunications system is ACeS.

28. The system according to claim 24, wherein said first and second user terminals are satellite/cellular phones.

29. The system according to claim 24, wherein said plurality of protocol parameters comprises a plurality of Data Link parameters.

* * * * *